United States Patent [19]

Möller

[11] 4,430,647

[45] Feb. 7, 1984

[54] MONITOR FOR DETECTING MALFUNCTION OF A ROTATION-ANGLE TRANSDUCER

[75] Inventor: Heinz Möller, Stuttgart, Fed. Rep. of Germany

[73] Assignee: Robert Bosch GmbH, Stuttgart, Fed. Rep. of Germany

[21] Appl. No.: 265,959

[22] Filed: May 21, 1981

[30] Foreign Application Priority Data

Jul. 4, 1980 [DE] Fed. Rep. of Germany ....... 3025379

[51] Int. Cl.³ ............................................. G08B 21/00
[52] U.S. Cl. ...................................... 340/679; 73/660; 235/103.5 R; 324/392; 340/681
[58] Field of Search ............... 340/672, 681, 679, 682, 340/683; 324/392; 73/462, 660; 235/103.5 R, 92 MP, 92 EC

[56] References Cited

U.S. PATENT DOCUMENTS

| | | | |
|---|---|---|---|
| 3,467,358 | 9/1969 | Zablotsky et al. | 73/660 X |
| 3,548,300 | 12/1970 | Nolting | 340/681 X |
| 3,877,003 | 4/1975 | Kawashima et al. | 340/681 |
| 3,896,377 | 7/1975 | Richardson | 235/92 MP X |
| 4,169,383 | 10/1979 | Guyot et al. | 73/462 |
| 4,201,911 | 5/1980 | Dering | 235/92 MP X |
| 4,255,809 | 3/1981 | Hillman | 235/92 EC X |
| 4,263,578 | 4/1981 | Fukuhara et al. | 340/681 |
| 4,337,647 | 7/1982 | Radcliffe et al. | 73/660 |

*Primary Examiner*—Glen R. Swann, III
*Attorney, Agent, or Firm*—Frishauf, Holtz, Goodman & Woodward

[57] ABSTRACT

In order to monitor the correct mounting of a rotation transducer on a rotary part, the output signal of the rotation of the indicator is caused to produce a first pulse at a particular angular position. An additional reference mark transducer is coupled to the rotary part to produce a second pulse for timing comparisons with the first pulse. Mechanical slippage of the rotation transducer on the rotary part can then be detected when one of the pulses is present without the other, and the failure of either of the transducers to operate can also be detected. The device is useful for assuring reliable operation of the rotation transducer controlling fuel injection in a Diesel engine.

8 Claims, 8 Drawing Figures

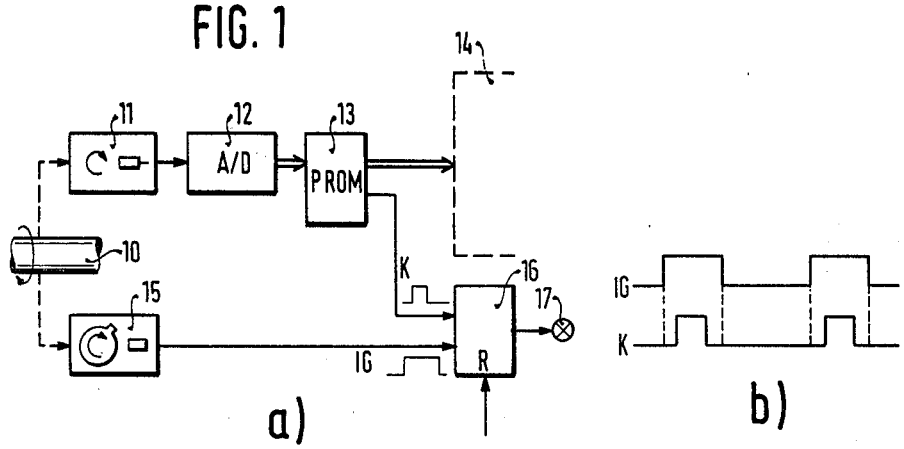
FIG. 1
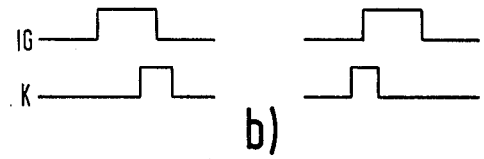
FIG. 2
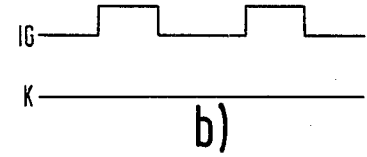
FIG. 3
FIG. 4

MONITOR FOR DETECTING MALFUNCTION OF A ROTATION-ANGLE TRANSDUCER

BACKGROUND OF THE INVENTION

This invention concerns apparatus for monitoring the output of an electrical indicator of rotation for detection of malfunctions. Such rotation transducers are utilized for control functions in engines.

It is known for conversion of rotary movements into an electrical signal to use a so-called rotation transducer. These rotation transducers deliver an analog output signal the value and, if appropriate, the sign of which are a measure for the angular position of a rotary part of which the movement is to be converted into an electrical voltage. To the extent that it is important to determine the angular position with reference to a particular zero-position absolutely, serious malfunction can occur when the rotation transducer is mismounted on the rotary part or shifts its position during operation as the result of a mechanical loading of the rotary part. In such cases, the output signal value, which is supposed to designate the angular position of the rotary part, no longer corresponds with this angular position, with the result that regulating or controlling devices responsive to the output signals that are intended to be controlled by the rotation transducer fall into malfunction.

A field of application for such rotation angle transducers is the determination of the angular position of a crankshaft of an internal combustion engine, for example a Diesel engine. In this case, precise information of the absolute angular position of the crankshaft relative to a reference mark is necessary for the correct determination of the moment of fuel injection. The reference mark may, for example, be the upper deadpoint of the cylinder in question. If the rotation transducer shifts during operation, as the result of a mechanical loading, the fuel injection control of the Diesel engine is provided by signals offset by the shift angle and damage to the Diesel engine can result. For this reason, there is a need for monitoring the output signals of such a rotation transducer with respect to the accuracy of the correspondence of the output signal to the angular position of a rotary part. Furthermore, it is necessary in such devices to recognize a possible failure of the rotary transducer in order to provide the necessary transition in such a case to an operationally safe condition of the installation or vehicle.

SUMMARY OF THE INVENTION

It is an object of this invention to provide an electrical monitor for checking the accuracy in operation of a rotation transducer and for promptly detecting malfunction or failure that may occur.

Briefly, from the output signal of the rotation transducer, a first pulse is formed corresponding to a particular angular position and is compared with a second pulse constituted by the output signal of an additional reference mark transducer which is mechanically coupled to the same rotary part of which the output of the rotation transducer designates the position. In a preferred form of the invention, the first pulse is smaller in duration than the output of the reference mark transducer, which may be referred to as the second pulse. In one form of the invention, the first and second pulses are respectively provided to non-inverting and inverting inputs of an AND-gate, the output of which gate is connected to a first alarm. In another form of the invention which may be used along with the first form, the first pulse is connected to the counting input and the second pulse to the reset input of a counter, of which the output corresponding to a count state greater than 1 is connected to a second alarm. A third kind of alarm can be provided if the second pulse is connected to the counting input and the first pulse to a reset input of a counter, with the alarm connected to an output representing a count content greater than 1. A fourth kind of alarm can be provided if the first pulse is connected to the counting input and the second pulse through an inverter to the reset input of a counter, with the alarm being connected to a counter output representing a count content greater than 1. The counter in any of these cases can be constituted of two flipflops connected in cascade. In any of the foregoing arrangements, in the start-up condition, the presence of the first and second pulses is checked in a prescribed angular interval of the rotary part, of which the position is indicated by the output, and the circuit means for comparing the pulses are activated only at a subsequent measuring moment when neither of these pulses is present.

The monitoring device of the invention has the advantage that, by the provision of a simple supplementary reference mark transducer which can be provided at low cost on a rotary part that is already available, precise monitoring of the basic positioning of the rotation transducer on the rotary part is made possible. As already mentioned, various logic elements can be utilized for correlation of the reference mark transducer signal and a pulse derived from the rotation transducer for differentiating between various kinds of errors, such as shifting of a transducer, failure of a transducer or blocking of a transducer output signal.

BRIEF DESCRIPTION OF THE DRAWINGS

The invention is further described by way of example with reference to the annexed drawings, in which FIG. 1a is a circuit diagram in block form of an embodiment of the invention;

FIG. 1b is a pulse-timing diagram relating to FIG. 1a;

FIGS. 2a, 3a and 4a are diagrams of different logical correlation arrangements for recognition of different error conditions, and FIGS. 2b, 3b and 4b are pulse diagrams relating respectively to the operation of the logic circuits of FIGS. 2a, 3a and 4a.

DESCRIPTION OF THE ILLUSTRATED EMBODIMENTS

In the apparatus illustrated in FIG. 1a, a rotary part 10 is, for example, the crankshaft of a Diesel engine. A rotation transducer 11 is connected rigidly to the rotary part 10 and provides an electrical output through an analog-to-digital converter 12, of which the output is connected to a storage circuit 13. An output of the storage circuit 13 is connected with a control unit 14, not further shown, that serves to control the Diesel motor, likewise not shown, while another output of the storage circuit 13 is connected to a comparison unit described in detail in what follows. The comparison unit 16 is arranged to control alarm means 17. Another input of the comparison unit 16 is connected to a reference mark transducer 15 that also is rigidly connected with the rotary part 10. Finally, the comparison unit 16 also has a reset input R.

The rotation transducer serves in a known way for measuring the rate of revolution and the angular position of the rotary part 10. For this purpose, the rotation transducer 11 generates an analog signal proportional to the angular position, which is converted into a digital signal in the analog/digital converter 12 and provided to the storage circuit 13. The information regarding the angular position transmitted to the control unit 14, while in the storage circuit 13 a control bit K is generated at a digital output of the storage unit 13 whenever the rotation transducer 11 passes through a predetermined particular angular position. This means that the signal K occurs in the form of a rectangular pulse everytime that the rotation transducer 11 reaches the predetermined angular position.

According to the invention, this control pulse K is now compared in the comparison unit 16 with a pulse IG from the reference mark transducer. The reference mark transducer 15 is preferably constituted as an inductive transducer. Such inductive reference mark transducers are very simple in construction and deliver, instead of an analog signal proportional to the angular position, only a single pulse when a predetermined angular position is reached. By constructive precautions, care is taken that the pulse IG of the reference mark transducer 15 lasts longer than the pulse K.

By comparison of the pulses K and IG, it can now be determined whether the rotation transducer delivers erroneous measurement values because of a shift in its mounting, because the coupling to the crankshaft has loosened or because the transducer is defective. The fastening of the transducers 11 and 15 to the rotary part 10 is so designed that the narrow pulse K occurs during the presence of the pulse IG, as the time diagram of FIG. 1b shows.

FIG. 2 shows a logic correlation circuit such as can be used in the comparison unit 16 for recognizing a particular kind of error. Here an AND-gate 18 is provided, at one input of which the signal K is provided and at another input, which is an inverting input, the signal IG is applied. The output of the AND-gate 18 is connected to a first alarm means 17a.

The logic circuit according to FIG. 2a serves for recognizing error conditions which one of the transducers 11 and 15 runs ahead or behind the other, as can occur by twisting about the shaft. Whereas in normal operation corresponding to FIG. 1b, the signal K has the logic value 1 when the signal IG also has the value 1, a twist of the transducers 11 and 15 with respect to each other has the result that the pulses K and IG will be offset in time, so that finally the signal K will also have the logic value 1 while the signal IG is still or again at logic value 0. In this case, the logic circuit 2a responds to activate the alarm 17a. It is evident that the correlation of the signals K and IG can also be done the other way around, in which the pulse K is longer than the pulse IG.

FIG. 3a illustrates another logic correlation for the comparison unit 16, where the signal IG is supplied to an input of a counter 19, of which the reset input is connected to the signal K. A counter output for the state of the counter being greater than 1 is then connected to a second alarm means 17b. This logic correlation circuit serves for recognition of an error condition in which the rotation transducer 11 fails and consequently no control pulse K appears. In normal operation, as shown in FIG. 1b, the counter 19 counts from 0 to 1 as the result of the leading edge of the pulse IG and is then promptly reset to 0 by the flank of the pulse K. If the signal K fails, and the second pulse of the counter 19 counts one more place, then the second alarm means 17b is actuated. It is evident that the counter 19 is shown only by way of example. Of course, any logically equivalent circuit can be substituted, for example two flipflops connected in cascade, so that the alarm indication can be actuated when the trailing edge of an IG pulse passes without a K pulse having appeared in the meanwhile.

The same arrangements will hold for a further logical correlation for recognition of the error condition in which the signal of the inductive transducer IG is missing. In that case, the same circuit components are provided as before in the comparison unit 16, except that the signals IG and K now go to different inputs.

Still another logical correlation for the comparison unit 16 is shown in FIG. 4a for recognizing the error condition in which the output of the inductive transducer IG is stuck at logic value 1. In this case, the signal K is supplied to the counting input of a counter 20, while the signal IG is led through an inverter 21 to the reset input of the counter 20. Also in this case, an output corresponding to a count content greater than 1 is connected to an alarm circuit, in this case the third alarm means 17c. As is evident from FIG. 4b, in this case the counter counts further at the arrival of the rising flank of the pulse K, without the signal IG providing for a resetting of the counter. Accordingly, what was said above regarding the counter applies also here, namely that the counter 20 is only symbolic and that any of a considerable number of other logic circuits can be used to recognize the same error.

The comparison unit 16 can also be constituted with a reset input R. By this input it can be provided that in putting the device into operation, for instance after maintenance or repair, the correct start-up conditions are provided with regard to the pulses IG and K. In this case, it is required that the device will be put back into operation at a moment when neither of the pulses IG or K is present, so that upon the next occurrence of the pulses a monitoring as described above can already take place. For this purpose, according to the invention, a further output of the storage device 13, not shown in FIG. 1a, is provided to produce a signal in predetermined angle intervals of the rotary part 10 during its rotary movement, so that it can be checked each time whether the pulses IG and K are present. If by one of these measurements it is determined that neither of the pulses IG and K occurs, the apparatus is fully switched in. The reset input R of the comparison unit 16 can be connected either to be actuated automatically for an initial period when the monitoring device is put into operation, or it can be connected for manual control for an initial operation after maintenance or repair.

Although the invention has been described with reference to particular illustrative embodiments, it will be understood that modifications and variations are possible withn the inventive concept. Thus, for example, the rotation transducer can also provide a speed signal as well as an angular position signal, or a speed signal can be derived from a stream of position signals.

I claim:

1. Apparatus for monitoring the output signal of a first rotation transducer driven by a rotary part of a Diesel engine for timing fuel injection, comprising:

means for generating a first recurrent pulse signal (K) in synchronism with the occurrence of a first particular angular position of said rotation transducer and for providing said first recurrent pulse signal at a first signal output;

a supplementary transducer driven by said rotary part for producing a second recurrent pulse signal (IG) in synchronism with occurrence of a particular angular position of said rotary part relative to a reference mark and for providing said second recurrent pulse signal at a second signal output, said second recurrent pulse signal being of a duration which is different from that of said first recurrent pulse signal;

time comparison means, having inputs respectively connected to said first and second signal outputs, for producing an output when the shorter of said first and second pulse signals is present during the absence of the longer of them, and first alarm means responsive to said output of said time comparison means.

2. Apparatus as defined in claim 1, in which said supplementary transducer is constituted so as to produce said second recurrent pulse signal (IG) with a signal duration which is longer than that of said first recurrent pulse signal (K) and in which said time comparison means comprises an AND-gate having a noninverting input connected to said first signal output, an inverting input connected to said second signal output, and an output connected to said first alarm means.

3. Apparatus as defined in claim 1, further comprising first counting means having a counting input connected to said second signal output, a reset input connected to said first signal output and an output for providing a signal corresponding to a count condition greater than 1, and also comprising second alarm means connected to said output of said first counting means.

4. Apparatus as defined in claim 3, in which said first counting means is constituted by two flipflop circuits in cascade.

5. Apparatus as defined in claim 1, further comprising an inverter, second alarm means and first counting means, said first counting means having a counting input connected to said first signal output, a reset input connected through said inverter to said second signal output, and an output for providing a signal corresponding to a count condition greater than 1, said first counting means output being connected to said second alarm means.

6. Apparatus as defined in claim 3, further comprising an inverter, third alarm means and second counting means, said second counting means having a counting input connected to said first signal output, a reset input connected through said inverter to said second signal output and an output for providing a signal corresponding to a count condition greater than 1, said second counting means output being connected to said third alarm means.

7. Apparatus as defined in claim 5, in which said first counting means is constituted by two flipflop circuits in cascade.

8. Apparatus as defined in claim 6, in which said first and said second counting means are each constituted by two flipflop circuits in cascade.

* * * * *